United States Patent [19]

Sutter

[11] 4,428,198

[45] Jan. 31, 1984

[54] HYDRAULIC MOTION CONVERSION DEVICE FOR ENGINES

[76] Inventor: S. R. Sutter, 1950 Highland, Lebanon, Mo. 65536

[21] Appl. No.: 302,735

[22] Filed: Sep. 16, 1981

[51] Int. Cl.³ .............................................. F02B 71/04
[52] U.S. Cl. ........................................ 60/595; 60/325
[58] Field of Search ........................... 60/325, 327, 595

[56] References Cited

U.S. PATENT DOCUMENTS

| | | | |
|---|---|---|---|
| 2,943,438 | 7/1960 | Huber | 60/595 |
| 3,068,639 | 12/1962 | Benoit | 60/595 X |
| 3,757,515 | 9/1973 | Pais | 60/595 |

FOREIGN PATENT DOCUMENTS 464785  1/1914  France ................. 60/595

*Primary Examiner*—Allen M. Ostrager
*Assistant Examiner*—Stephen F. Husar

*Attorney, Agent, or Firm*—Kokjer, Kircher, Bradley, Wharton, Bowman & Johnson

[57] ABSTRACT

A hydraulic device for a reciprocating piston engine to convert the piston motion into rotation of a drive shaft. A hydraulically driven rotor is mounted for rotation on the drive shaft and has a close machine fit with the rotor housing. The cylinder in which the piston reciprocates is mounted on the rotor housing and communicates with the peripheral surface of the rotor through specially located openings formed in a plate. The rotor contains hydraulic fluid and its periphery has a portion provided with open passages to direct fluid into the base end of the cylinder during the compression stroke. During the power stroke of the piston, the fluid in the base end of the cylinder is expelled against vanes which are formed on the rotor periphery, thereby turning the rotor. A cam and associated linkage mechanically force the piston to the bottom dead center position at the end of each power stroke.

10 Claims, 6 Drawing Figures

HYDRAULIC MOTION CONVERSION DEVICE FOR ENGINES

BACKGROUND AND SUMMARY OF THE INVENTION

This invention relates generally to the field of engines and more particularly to the conversion of reciprocating motion of a piston into rotary motion of a drive shaft.

Internal combustion engines and other types of reciprocating piston engines conventionally have connecting rods, a crankshaft and related mechanical components which translate the reciprocating motion of a piston into rotation of the drive shaft of the engine. These components are subject to the usual problems that are inherently associated with mechanical parts, and they add significantly to the high construction and maintenance costs of engines and to operational and performance inefficiencies.

The present invention is aimed at eliminating these problems and has, as its primary goal, the provision of a hydraulic device which efficiently converts reciprocating piston motion into rotary motion while avoiding the use of connecting rods, crankshafts, and the associated mechanical linkages that are typical of existing engines. Replacing the crankshaft is a hydraulically driven rotor having a special construction which permits it to be rotated by one or more reciprocating pistons without any direct mechanical connection between the pistons and rotor.

More specifically, the rotor has a specially formed periphery which is sealed to the machined rotor. The peripheral surface of the rotor has a series of vanes on one half and open passages on the other half offset from the vanes. During the compression stroke of the piston, the open passages register with an opening in the base end of the cylinder, and hydraulic fluid carried within the rotor is forced into the cylinder by the centrifical force resulting from turning of the rotor. During the power stroke of the piston, another opening in the base of the cylinder registers with the vaned area of the rotor, and the fluid in the cylinder is then forcefully directed against the vanes to drive the rotor. The apparatus further includes a cam and associated spring loaded linkage that mechanically force the piston to the bottom dead center position at the end of each power stroke. The hydraulic fluid which is directed against the vanes is circulated back into the rotor after being cooled in a radiator or other cooling device.

DETAILED DESCRIPTION OF THE INVENTION

In the accompanying drawings which form a part of the specification and are to be read in conjunction therewith and in which like reference numerals are used to indicate like parts in the various views:

FIG. 1. is a longitudinal sectional view of a hydraulic motion conversion device constructed according to a preferred embodiment of the present invention, with the broken lines illustrating movement of the piston toward the bottom dead center position;

Figure 1:
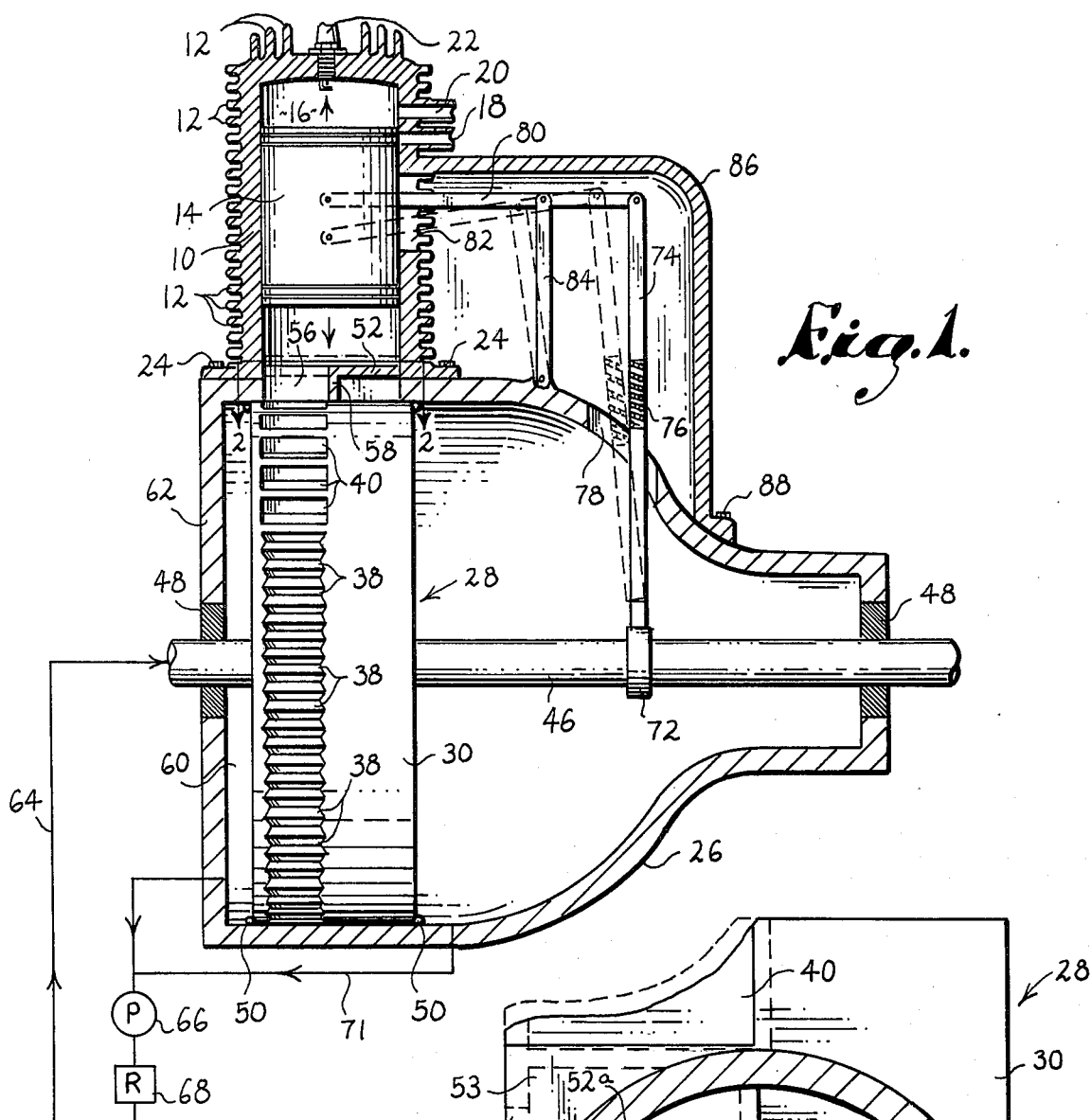

Referring now to the drawing in more detail and initially to FIG. 1, numeral 10 designates a cylinder having a series of fins 12 on its outer surface. Cylinder 10 is of substantially the same type as is conventionally used in internal combustion engines, and the engine employing the cylinder includes the usual additional components necessary to operate it. A piston 14 is closely received in the cylinder for reciprocating up and down movement therein. A compression chamber 16 is located at the top of cylinder 10 and receives air through a port 18. It is contemplated that the fuel will be injected into the top of the cylinder and that a blower (not shown) will supply air through port 18 for purging the combustion gases of the previous cycle and supplying air for mixing with the incoming fuel charge. The combustion gases are discharged through an exhaust port 20 located above the port 18. A conventional spark plug 22 serves to ignite the fuel at the appropriate time.

In accordance with the present invention, the cylinder 10 is bolted at 24 to a bell housing 26 containing a specially constructed rotor which is generally identified by numeral 28. The rotor 28 is in the form of a hollow wheel having solid opposite sides and a specially formed peripheral surface. The rotor has a hollow interior which carries a supply of hydraulid fluid F.

Figure 2:
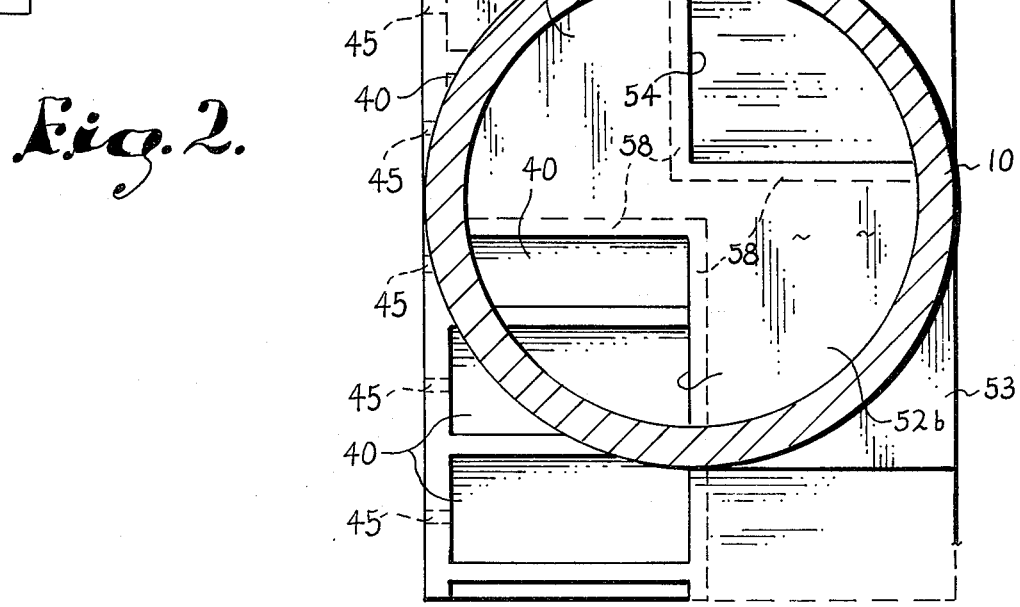
FIG. 2 is a sectional view on an enlarged scale taken generally along line 2—2 of FIG. 1 in the direction of the arrows and showing the configuration of the plate controlling flow between the cylinder and rotor.
Figure 3:
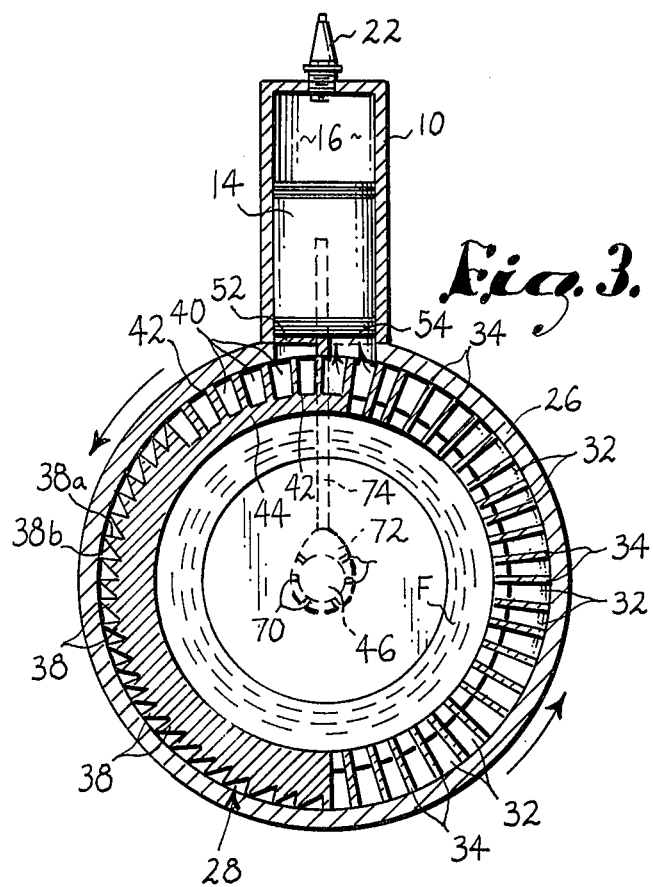
FIG. 3 is a transverse sectional view of the device illustrating the piston at the bottom dead center position.
Figure 4:
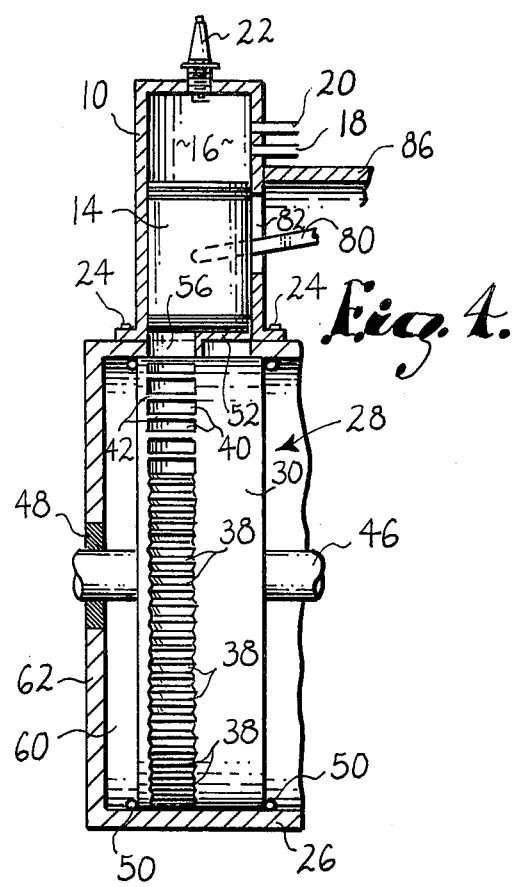
FIG. 4 is a longitudinal sectional view of the device in the position of FIG. 3.
Figure 5:
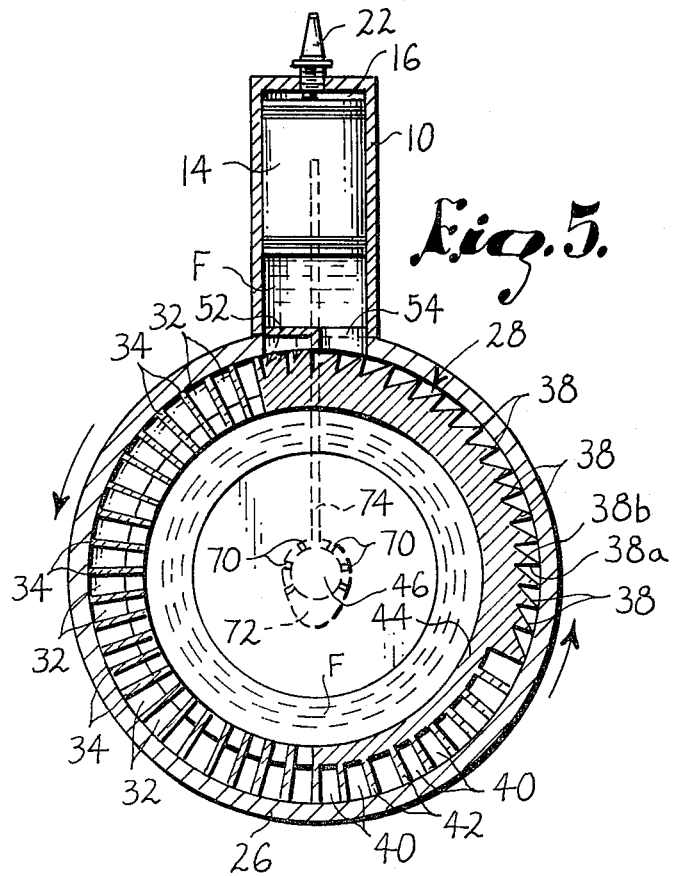
FIG. 5 is a transverse sectional view similar to FIG. 3, but showing the piston in the top dead center position.
Figure 6:
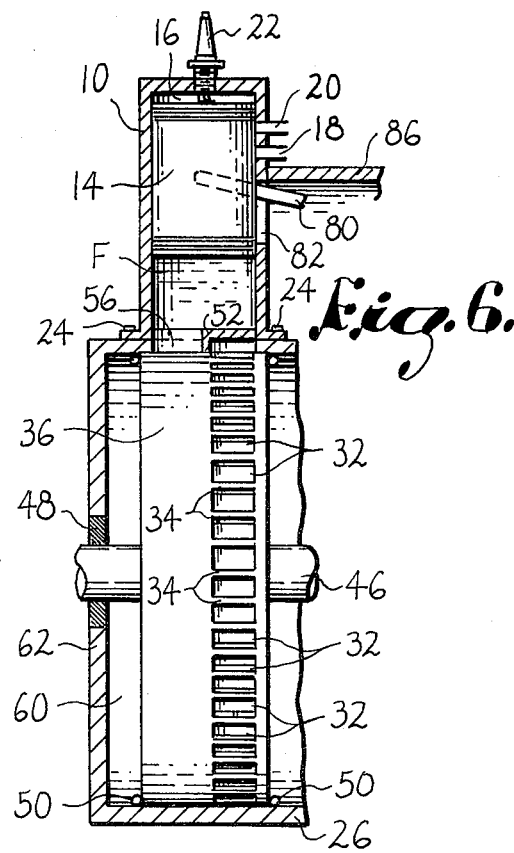
FIG. 6 is a longitudinal sectional view of the device in the position shown in FIG. 5.

Referring additionally to FIGS. 3–6, the peripheral surface of rotor 28 is divided into two equally sized side by side annular surfaces by a circumferencial center line extending around the periphery of the rotor. As best shown in FIGS. 4 and 6, the annular surface on one side of the rotor has a smooth portion 30 extending approximately half way around the rotor. The remaining half of the rotor on the same side is provided with a series of open passages 32 which are separated from one another by small partitions 34. The passages 32 extend through the peripheral area of the rotor and provide paths for the flow of hydraulic fluid F from inside of the rotor to the outside of the rotor. The other annular surface on the rotor periphery includes a smooth portion 36 (FIG. 6) extending through an arc of approximately 180°, a plurality of vanes 38 extending through an arc of approximately 120°, and a series of pockets 40 extending through the remaining 60° arc. Pockets 40 are separated from one another by small partitions 42 and are separated from the inside of the rotor by a solid panel 44. Each pocket 40 has a small drain hole 45 (see FIG. 2) extending through one side wall in order to drain off fluid to one side of the rotor.

As best shown in FIGS. 3 and 5, the open passages 32 are offset circumferentially from the vanes 38 and pockets 40. The passages 32 occupy approximately 180° of the rotor periphery, while the vanes 38 and pockets 40 together occupy the other 180° of the rotor periphery. Smooth surface 30 extends beside vanes 38 and pockets 40, while the other smooth surface 36 is located beside passages 32. Rotor 28 turns in the direction indicated by the directional arrows in FIGS. 3 and 5, and the pockets 40 are adjacent to and in a trailing position relative to the vanes 38. Each vane 38 has one side 38a oriented generally radially of the rotor and an inclined side 38b which is offset from a radial orientation. The inclined side 38b is in a leading position with respect to the corresponding side 38a of the vane.

Rotor 28 is mounted on a shaft 46 which serves as the drive shaft of the engine. Shaft 46 is supported for rotation by bearings 48 (FIG. 1) secured to the housing 26. The specially formed peripheral surface of rotor 28 conforms with and barely clears the inside surface of housing 26, and the housing surface is machined where it is adjacent to the rotor periphery. A pair of seal rings 50 provide seals between housing 26 and the edges of the rotor periphery.

The base end of cylinder 10 is open along with the corresponding portion of housing 26, and the flow of fluid through the aligned open portions of the cylinder and housing is controlled by a specially formed plate 52 which is best illustrated in FIG. 2. To conform with the curved shape of the rotor periphery, the plate 52 is flared at diametrically opposed locations, as indicated at 53 in FIG. 2. Plate 52 covers two of the opposite quadrants 52a and 52b of the cylinder bottom. Plate 52 presents openings 54 and 56 in the other two opposed quadrants, and these quadrants are thus open between the base end of cylinder 10 and the peripheral surface of rotor 28. Cylinder 10 has the same diameter as the width of the peripheral surface of the rotor, and opening 54 is located on the half of the rotor periphery which contains smooth portion 30 and the open passages 32. The other opening 56 registers with that half of the rotor periphery containing the other smooth portion 36, the vanes 38 and pockets 40.

The hydraulic fluid which is directed against vanes 38 and the fluid which drains out of pockets 40 through the drain holes 45 enters a chamber 60 (see FIG. 1) located between one side of the rotor and one side wall 62 of housing 26. The fluid is circulated in controlled fashion from chamber 60 back into the hollow rotor 28. A fluid line 64 has one end located in chamber 60 and the opposite end extending into shaft 46 which is hollow in at least that portion extending from its connection with line 64 through the center of the rotor 28. The fluid is pumped through line 64 and into shaft 46 by a pump 66 and is cooled prior to entering the shaft by a radiator 68 or any other suitable type of cooling device. The portion of shaft 46 extending within rotor 28 is provided with a series of passages 70 (FIGS. 3 and 5) which direct the fluid into the rotor from within the hollow portion of the shaft. Another line 71 extends from the rotor interior to connection with the suction side of pump 66 to drain off any fluid leaking into the housing 26.

With reference to FIG. 1, a cam 72 is carried on shaft 46. The cam has a follower in the form of a vertical link 74 having upper and lower portions continuously urged away from one another by a compression spring 76. Link 74 extends through an opening 78 formed in housing 26. A generally horizontal link 80 is pinned at one end to the top end of link 74. Link 80 extends through an opening 82 formed in cylinder 10, and the end of link 80 extends into piston 14 and is pinned thereto. Another link 84 is pinned at its top end to an intermediate portion of link 80 and at its bottom end to a lug formed on housing 26. The linkage is enclosed by a cover 86 which is bolted to housing 26 at 88 and which covers the openings 78 and 82.

In operation of the engine, piston 14 moves upwardly to compress the fuel which is injected into the compression chamber 16. At the beginning of the compression stroke of piston 14, the rotating rotor 28 is oriented in the position shown in FIG. 3. As piston 14 moves upwardly during the compression stroke, the open passages 32 move in sequence past opening 54 and the bottom of the cylinder, and the hydraulic fluid F contained within the rotor is forced outwardly through passages 32 by centrifugal force (and the suction action provided by the piston). The fluid thus flows from each passage 32 into the bottom or base end of the cylinder 10 and assists in forcing piston 14 upwardly during the compression stroke. As the piston moves through the compression stroke, the smooth portion 36 blocks opening 56 to prevent the fluid from passing downwardly through it.

When piston 14 has moved upwardly to the top dead center position shown in FIGS. 5 and 6, the compression stroke is completed and the spark plug 22 is then fired to effect a power stroke forcing the piston downwardly from the top dead center position to the bottom dead center position shown in FIGS. 3 and 4. During the power stroke, smooth portion 30 of the rotor registers with opening 54 and the vanes 38 move beneath the other opening 56. Consequently, opening 54 is blocked by portion 30 of the rotor and the vanes 38 are exposed to the cylinder through opening 56. The downward motion of piston 14 forcefully expels the hydraulic fluid from the base end of the cylinder through opening 56 and against surfaces 38a of the vanes in order to rotate rotor 28. As piston 14 approaches the base end of cylinder 10 to complete the power stroke, pockets 40 move into registration with opening 56 and receive the small amount of fluid which is forced out of the cylinder near the end of the power stroke. When the power stroke has been completed, all of the hydraulic fluid has been forced out of the cylinder, pockets 40 have moved past opening 56, and passages 32 begin moving beneath opening 54 as shown in FIG. 3. The next compression stroke of the engine then begins.

The hydraulic fluid which is directed against vanes 38 to effect turning of the rotor deflects off of the vanes into chamber 60, and the fluid forced into pockets 40 drains into chamber 60 through the drain holes 45. The fluid is pumped through the cooling radiator 68 by pump 66 and is returned to the interior of the rotor through line 64 and through the hollow portion of shaft 46. In this manner, pump 66 returns fluid to the rotor at the same rate it is removed from the rotor. It is contemplated that rotor 28 will be only partially filled with hydraulic fluid which will be forced outwardly to assume the ring like configuration shown in FIGS. 3 and 5. The fluid thus is carried in passages 32 at all times and enters the bottom of cylinder 10 immediately as the passages register in sequence with opening 54 and the bottom of the cylinder. The precise machine fit between the periphery of rotor 28 and the inside surface of housing 26, along with the seal rings 50, prevents significantly leakage of the fluid. Any fluid that does leak past the seals is maintained within housing 26, and any fluid that leaks through opening 78 or past the piston and through opening 82 is prevented from escaping by the cover 86.

The cam 72 and associated mechanical linkage assure that piston 14 reaches the bottom dead center position against the base end of the cylinder at the end of each power stroke. The cam is oriented such that its lobe projects upwardly at the rotative position of shaft 46 corresponding to the bottom dead center position of the piston. The cam lobe acting against link 74 tends to push the link upwardly. This motion is resisted by link 84 which causes link 74 to rock inwardly toward cylinder 10, thereby mechanically forcing the end of link 80 and the piston 14 downwardly as indicated in broken lines in FIG. 1. When the lobe of cam 72 points directly upwardly, piston 14 is forced downwardly against the plate 52 located at the base of the piston. Consequently, ports 18 and 20 are assured of being exposed to complete the discharge of exhaust gases and provide for a complete new charge of air through the intake port 18. The spring 76 relaxes the force of the linkage in the event that the combustion or power stroke is sufficient in itself to force piston 14 to the bottom dead center position.

It is to be understood that one or more additional cylinders identical to cylinder 10 can be positioned around housing 26 to increase the rotational force imparted to rotor 28. If desired, conventional intake and exhaust valves can replace the ports 18 and 20 illustrated in the drawings.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompany drawing is to be interpreted as illustrative and not in a limiting sense.

Having thus described the invention, I claim:

1. A motion conversion device for an engine having a piston reciprocating in a cylinder to provide compression and power strokes, said device comprising:
   a housing;
   a hollow rotor mounted for rotation in said housing and adapted to hold hydraulic fluid, said rotor having a periphery sealed to said housing and divided into first and second annular surfaces extending generally side by side around said periphery;
   an open portion of said first annular surface providing fluid communication between the inside and outside of said rotor to direct fluid out of said rotor and into said cylinder;
   a plurality of vanes on said second annular surface for receiving fluid from the cylinder to effect rotation of said rotor; and
   means for sealing said vanes from the cylinder and providing communication between said open portion and the cylinder during the compression stroke and for sealing said open portion from the cylinder and providing communication between the cylinder and vanes during the power stroke, whereby fluid is forced from the rotor into the cylinder and against the piston during the compression stroke of the piston and is expelled from the piston against said vanes during the power stroke to effect driving rotation of said rotor.

2. A device as set forth in claim 1, wherein:
   said open portion of the first annular surface comprises a plurality of passages located on a preselected arcuate portion of said first annular surface; and
   said vanes are located on a preselected arcuate portion of said second annular surface offset circumferentially from said arcuate portion of the first surface.

3. A device as set forth in claim 2, including:
   a plurality of pockets in said second annular surface adjacent said preselected arcuate portion thereof for receiving fluid expelled from the cylinder as the power stroke is completed; and
   a drain hole in each pocket for draining fluid therefrom.

4. A device as set forth in claim 2, wherein said sealing means includes a pair of openings in said housing, one opening registering with the cylinder adjacent said first annular surface and the other opening registering with the cylinder adjacent said second annular surface.

5. A device as set forth in claim 1, including means for circulating the fluid impacting against said vanes back into said rotor.

6. In an engine, a method of converting reciprocating motion of a piston into rotary motion of a shaft, said method comprising the steps of:
   mounting a hollow rotor having a vaned periphery on said shaft;
   inserting hydraulic fluid into said rotor;
   directing fluid out of said rotor and against said piston to assist in effecting a compression stroke thereof;
   driving said piston to effect a power stroke thereof;
   mechanically forcing the piston to a bottom dead center position to assure completion of the power stroke;
   utilizing the power of the piston to force the fluid against said vaned periphery of the rotor, thereby effecting rotation of the rotor and shaft; and
   returning the fluid which impacts against said vaned periphery to the inside of the rotor.

7. In an engine having a cylinder and a piston reciprocating toward a base end of the cylinder to effect a power stroke and away from the base end of the cylinder to effect a compression stroke, the combination of:
   a housing to which said cylinder is mounted with the base end of the cylinder adjacent said housing;
   a hollow rotor mounted for rotation in said housing and adapted to hold hydraulic fluid, said rotor having a periphery in sealed contact with said housing;
   a first annular surface on said periphery of the rotor having a smooth portion and a plurality of open passages on a preselected arcuate portion thereof, said passages providing fluid communication between the inside and outside of the rotor to direct fluid into the cylinder;
   a second annular surface on said periphery of the rotor extending around the periphery in side by side relation to said first annular surface, said second surface having a smooth portion circumferentially offset from the smooth portion of said first surface and a plurality of vanes on a preselected arcuate portion of the second surface circumferentially offset from said arcuate portion of the first surface;
   a first opening in the base end of the cylinder providing communication between the inside of the housing and the inside of the cylinder, said arcuate portion of the first annular surface registering with said first opening during rotation of the rotor concurrently with the compression stroke and said smooth portion of the first annular surface closing said first opening during rotation of the rotor concurrently with the power stroke; and a second opening in the base end of the cylinder offset from said first opening and providing communication between the inside of the cylinder and the inside of the housing, said arcuate portion of the second annular surface registering with said second opening during rotation of the rotor concurrently with the power stroke and said smooth portion of the second annular surface closing said second opening during rotation of the rotor concurrently with the compression stroke, whereby fluid is forced from said rotor through said passages and into the base end of the cylinder through said first opening during the compression stroke and is expelled from the cylinder against said vanes through said second opening during the power stroke to effect driving rotation of said rotor.

8. The combination of claim 7, including:

a plurality of pockets in said second annular surface adjacent said arcuate portion thereof for receiving fluid expelled from the cylinder as the piston approaches the base end of the cylinder to complete the power stroke; and a drain hole in each pocket for draining fluid therefrom.

9. The combination of claim 7, including:

a shaft connected with said rotor for rotation therewith;

a cam carried on said shaft; and mechanical linkage means operated by said cam in a manner to mechanically force said piston to the base end of the cylinder to assure completion of the power stroke.

10. The combination of claim 9, wherein said linkage means includes:

a cam follower;

resilient means for urging said cam follower against said cam; and link means interconnecting said cam follower with said piston and operable to force the piston against the base end of the cylinder when the cam reaches a rotative position corresponding to completion of the power stroke.

* * * * *